US010445490B2

(12) United States Patent
Shem Tov et al.

(10) Patent No.: US 10,445,490 B2
(45) Date of Patent: Oct. 15, 2019

(54) REMOTE DESKTOP ACCESS TO A TARGET MACHINE

(71) Applicant: Cyber-Ark Software Ltd., Petach-Tikva (IL)

(72) Inventors: Doron Shem Tov, Tel-Aviv (IL); Amir Carmi, Pardesia (IL); Arthur Bendersky, Rosh HaAyin (IL)

(73) Assignee: CyberArk Software Ltd., Petach-Tikva (IL)

( * ) Notice: Subject to any disclaimer, the term of this patent is extended or adjusted under 35 U.S.C. 154(b) by 210 days.

(21) Appl. No.: 15/619,621

(22) Filed: Jun. 12, 2017

(65) Prior Publication Data
US 2018/0359237 A1    Dec. 13, 2018

(51) Int. Cl.
*H04L 29/06* (2006.01)
*G06F 21/44* (2013.01)

(52) U.S. Cl.
CPC .......... *G06F 21/44* (2013.01); *H04L 63/105* (2013.01); *H04L 63/14* (2013.01)

(58) Field of Classification Search
CPC ....... H04L 63/10; H04L 63/101; H04L 63/06; H04L 63/061; H04L 63/123; H04L 9/0643; H04L 9/0822; H04L 9/0891; H04L 63/08; H04L 63/14; H04L 63/1408; H04L 63/1433; H04L 63/1416; G06F 21/21; G06F 21/44; G06F 21/50–577
See application file for complete search history.

(56) References Cited

U.S. PATENT DOCUMENTS

| 2015/0128205 | A1* | 5/2015 | Mahaffey | H04L 63/20 726/1 |
| 2015/0326594 | A1* | 11/2015 | Chari | H04L 67/303 726/23 |
| 2017/0279900 | A1* | 9/2017 | Yoon | H04L 67/148 |
| 2017/0351537 | A1* | 12/2017 | AbiEzzi | G06F 3/14 |

OTHER PUBLICATIONS

Mandiant "APT1: Exposing One of China's Cyber Espionage Units", Mandiant, APT1 Report, p. 1-74, 2013.
Novetta "Novetta Cyber Analytics: Architecture Overview", Novetta, Technical Brief, p. 1-8, May 2016.

* cited by examiner

*Primary Examiner* — Khalil Naghdali
*Assistant Examiner* — Shaqueal D Wade
(74) *Attorney, Agent, or Firm* — Finnegan, Henderson, Farabow, Garrett & Dunner, LLP

(57) ABSTRACT

A method for assessing a risk level of a remote desktop access connection includes establishing a remote desktop access connection session between a target machine and the client machine over a network. The remote desktop access connection is established in response to a request received from the client machine. The remote desktop access connection is used acquire, from the client machine, information pertaining to a system environment of the client machine during the connection session. The acquired information is analyzed by comparing the acquired information to information indicative of a defined use of the client machine. Based on the analysis, an assessment is generated of the risk level of the connection session and/or to identify suspicious use of the remote desktop access connection by the client machine.

25 Claims, 8 Drawing Sheets

REMOTE DESKTOP ACCESS TO A TARGET MACHINE

FIELD AND BACKGROUND OF THE INVENTION

The present invention, in some embodiments thereof, relates to remote desktop access to a target machine and, more particularly, but not exclusively, to generating an assessment of a remote desktop access connection session.

Network communication solutions that facilitate communication between remote networked machines can be an effective disruptive tool used by attackers for malicious purposes from halfway around the world.

One such tool is Microsoft's Remote Desktop Connection (RDC) user application. RDC enables a user to remotely log into a networked computer and interactively use the desktop interface as if they were sitting in front of the local machine. RDC uses the Microsoft service Remote Desktop Protocol (RDP) to facilitate communication between the remote client and the local machine being accessed.

However, findings show that gaining unauthorized access to RDP-enabled machines has been and continues to be an effective attacker technique. For example, when the credentials used by the attackers are stolen without the user's knowledge, attackers can pretend to be a remote user without raising suspicion.

Existing approaches deal with analyzing network traffic by observing the raw packet capture on a network. In other words, existing solutions look for anomalies in the network data traffic. Typical forensics-based solutions include packet inspection, such as deep packet inspection (DPI) techniques, selective packet inspection methods and the like. These solutions generally observe and parse out data from the packet capture on the network in order to detect the presence of network anomalies. An example is Novetta sensor software, which reviews the captured packets to extract IP address, cookies and other data attributes that characterize what is happening within the network traffic.

Typically, forensics-based solutions operate with the extremely limited information that is present in the data packet and which may not be sufficient to detect sophisticated attacks. Furthermore, RDP operates with a known protocol which allows the attacker to take active steps to prevent anomalous data from being detectable in by packet inspection methods. Thus attacks using remote access tools can be disguised and go undetected.

Additional background art includes:
[1] The "APT1 Exposing One of China's Cyber Espionage Units", *Mandiant*, 18 Feb. 2013; and
[2] "Architecture Overview Technical Brief", *Novetta Cyber Analytics*, May 2016.

SUMMARY OF THE INVENTION

When a connection session is established between a client machine and a target machine over a remote desktop access connection, information about the client machine becomes available to the target machine through the remote desktop access connection. In embodiments of the invention, the target machine uses the remote desktop access connection to acquire information about system environment of the client machine. This information is compared to a defined use of the client machine.

The term "defined use" includes, but is not limited to, any possible functionality of running and/or connected services as defined in a particular manner for the client machine and/or with respect to a particular one or more users or user accounts of the client machine. Examples include where access and use to stored content, residing applications and operation, configuration, display properties etc.

Based on the analysis, an assessment is made of a risk measure that characterizes the level of risk associated with the connection session. The risk measure may additionally assess the risk level of connection itself.

Additionally, a control action or actions may be applied to the connection session and/or the connection based on the risk measure. The type of control action that is applied may depend on further factors such as the type of client machine, whether the client application has supplied suspicious credentials or is behaving in a suspicious manner, etc.

The acquired information may also be stored for later use, for example for offline analysis and/or to recover from a security breach.

As used herein the terms "client system environment" and "system environment" mean the combination of hardware and software in use by the client machine, such as the client machine's operating system, local resources, connected devices, storage and processing units, etc.

According to an aspect of some embodiments of the present invention there is provided a system which includes at least one non-transitory computer readable storage medium storing instructions and at least one processor. The at least one processor executes the instructions to:

in response to a request received from a client machine for remote desktop access to a target machine, establish a connection session of a remote desktop access connection with the client machine over a network;

using the remote desktop access connection, acquire from the client machine information pertaining to a system environment of the client machine during the connection session;

analyze the acquired information by comparing the acquired information to information indicative of a defined use of the client machine; and based on the analyzing, generate an assessment of a risk measure of the remote desktop access connection session.

According to some embodiments of the invention, analyzing the acquired information includes determining a configuration of the client machine based on the acquired information.

According to some embodiments of the invention, the acquired information includes information indicative of at least one setting of an operating system associated with the client machine.

According to some embodiments of the invention, the acquired information includes information indicative of a user-specific setting of the client machine.

According to some embodiments of the invention, the acquired information includes information indicative of a connection setting pertaining to the client machine for the connection session.

According to some embodiments of the invention, the acquired information includes information indicative of a screen resolution of the client machine.

According to some embodiments of the invention, the acquired information includes information indicative of a language setting for the client machine.

According to some embodiments of the invention, the acquired information includes information indicative of a parameter effecting visual display characteristics of the client machine.

According to some embodiments of the invention, the acquired information includes information indicative of a process executing on the client machine.

According to some embodiments of the invention, the acquired information includes information indicative of an application running on the client machine. According to some embodiments of the invention, the acquired information includes information indicative of peripheral equipment associated with the client machine.

According to some embodiments of the invention, the processor executes further instructions to apply, via the remote desktop access connection and based on the assessed risk measure, a control action governing actions performed by the client machine on the target machine during the connection session.

According to some embodiments of the invention, acquiring information from the client machine includes extracting the information from messages received from the target machine over the remote desktop access connection.

According to some embodiments of the invention, the acquiring includes invoking a data transfer between the client machine and the target machine via the remote desktop access connection.

According to some embodiments of the invention, acquiring information from the client machine includes invoking a data transfer between the client machine and a remote server in connection with the target machine.

According to some embodiments of the invention, the processor executes further instructions to verify, based on the generated assessment and according to the acquired information, a client application on the client machine which initiated the request for the remote desktop access connection.

According to some embodiments of the invention, the processor executes further instructions to forward the request for the remote desktop access connection to a target machine.

According to an aspect of some embodiments of the present invention there is provided a method for assessing a risk of a remote desktop access connection session. The method includes executing, by at least one hardware processor, program instructions to:

in response to a request received from a client machine for remote desktop access to a target machine, establish a connection session of a remote desktop access connection with the client machine over a network;

using the remote desktop access connection, acquire from the client machine information pertaining to a system environment of the client machine during the connection session;

analyze the acquired information by comparing the acquired information to information indicative of a defined use of the client machine; and based on the analyzing, generate an assessment indicative of a risk measure of the connection session.

According to some embodiments of the invention, the analysis includes determining a configuration of the client machine based on the acquired information.

According to some embodiments of the invention, the processor executes further instructions to execute the instructions to apply, via the remote desktop access connection and based on the assessed risk measure, a control action governing actions performed by the client machine on the target machine during the connection session.

According to some embodiments of the invention, acquiring information from the client machine includes extracting the information from messages received from the target machine over the remote desktop access connection.

According to some embodiments of the invention, acquiring information from the client machine includes invoking a data transfer between the client machine and the target machine via the remote desktop access connection.

According to some embodiments of the invention, acquiring information from the client machine includes invoking a data transfer between the client machine and a remote server in connection with the target machine.

According to some embodiments of the invention, the processor executes further instructions to verify, based on the generated assessment and according to the acquired information, a client application on the client machine which initiated the request for the remote desktop access connection.

According to an aspect of some embodiments of the present invention there is provided a non-transitory computer readable medium including instructions that, when executed by at least one processor, cause the at least one processor to perform operations for assessing a risk measure of a remote desktop access connection. The operations include:

in response to a request received from a client machine for remote desktop access to a target machine, establishing a connection session of a remote desktop access connection with the client machine over a network;

using the remote desktop access connection, acquiring from the client machine information pertaining to a system environment of the client machine during the connection session;

analyzing the acquired information by comparing the acquired information to information indicative of a defined use of the client machine; and based on the analyzing, generating an assessment of a risk measure of the remote desktop access connection session.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions.

Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

DESCRIPTION OF SPECIFIC EMBODIMENTS OF THE INVENTION

Figure 1:
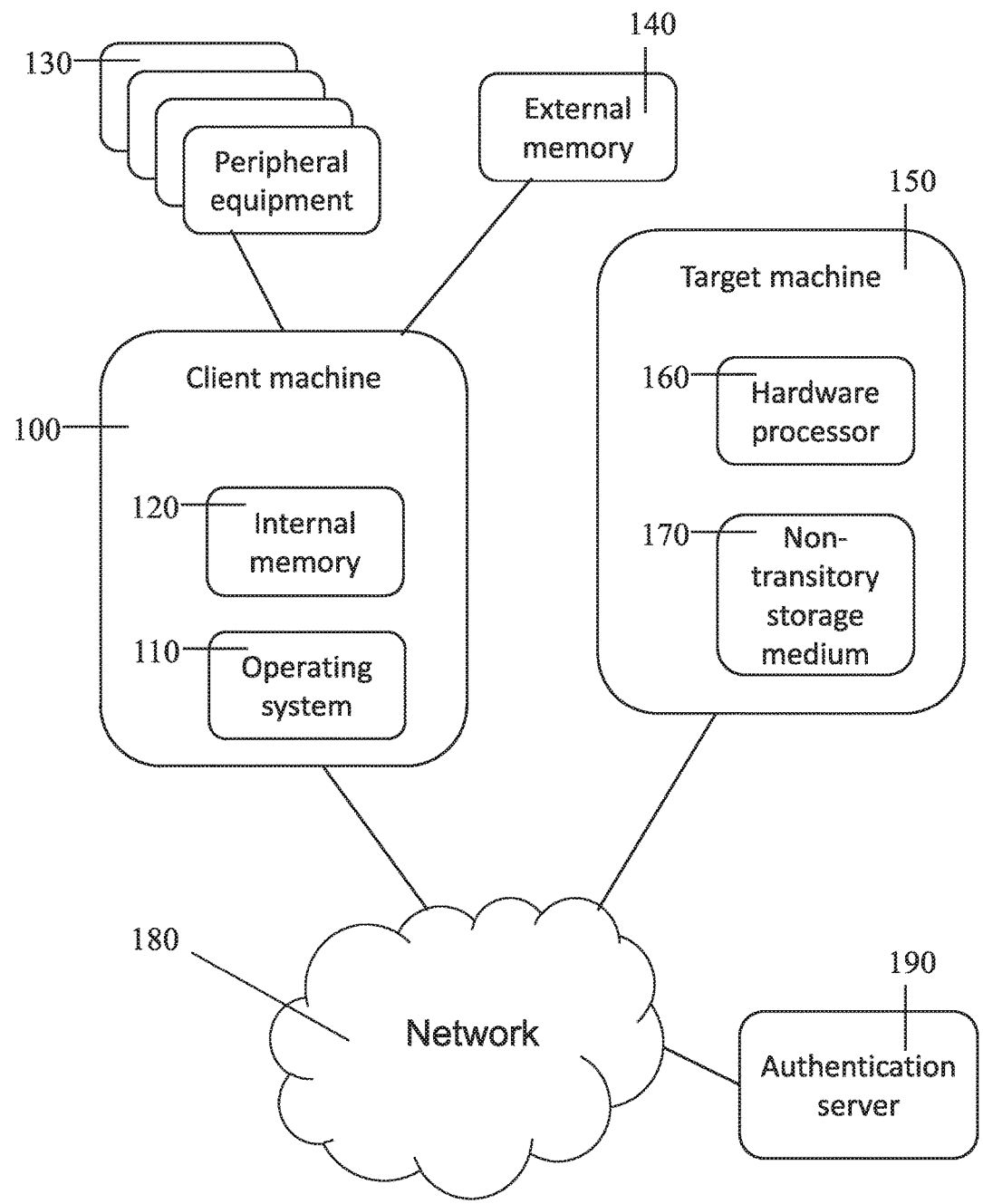
FIG. 1 is a simplified network diagram illustrating a configuration of client machine and target machine, according to embodiments of the invention.

The present invention, in some embodiments thereof, relates to remote desktop access to a target machine and, more particularly, but not exclusively, to generating an assessment of a remote desktop access connection session.

Embodiments of the invention disclosed herein enable a target machine to assess a client system which is connected to the target machine by a remote desktop access connection. This assessment is based on an analysis of information about the client system environment which is acquired by the client machine over the established remote desktop access connection. No additional connection between the target and client machines is required. This analysis may be performed independently of other activities occurring over the remote desktop access connection.

The analysis provides information about the risk level of the remote desktop connection and/or identifies suspicious use of the target system by the client machine. The result of the analysis may be used to apply a control action on the operations performed by the user client and/or on the connection itself.

The analysis and assessment may be performed autonomously in any system environment which supports remote desktop access, transparently to the ongoing activity and type and/or operation of the client system. No software or logic must be installed on the client machine.

The analysis and/or control actions may be prompted and applied at any phase during the connection between the client and the target machines (e.g. when the remote desktop access connection is established and/or on demand). In some embodiments, the target machine dynamically identifies and counters malicious behavior in real time.

An additional benefit is that the acquisition of client machine information and analysis thereof are not detectable by the client machine and do not leave traces on the client machine. Often, an attacker hides information while penetrating an organization in order to avoid being detectable as a threat. The embodiments presented herein utilize data an attacker will not necessarily hide, because it might be useful to the attacker during the attack activity (for example, a client machine script file the attacker wants to use). An attacker with stolen credentials might assume that there are defense mechanisms on the target machine but would not expect that their own client machine is exposed and being monitored.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Reference is now made to FIG. 1 which is a simplified network diagram illustrating a configuration of client machine and target machine, according to embodiments of the invention. Client machine 100 and target machine 150 have the capabilities required to establish a remote desktop access connection over network 180. The remote desktop connection enables client machine 100 to access resources of target machine 150 and/or to perform operations on target machine 150. Typically, client machine 100 functions as a Graphical User Interface (GUI) which displays the activity being performed on the target machine 150 and enables a user to perform operations on the target machine.

For purposes of explanation, client machine 100 is illustrated in a non-limiting configuration which includes operating system 110 and local memory 120, and with access to peripheral equipment 130 and external memory 140. However, client machine 100 may have a different internal configuration and/or access to different external resources.

Client machine 100 and target machine 150 establish a session of a remote desktop access connection over network 180, in response to a request received from a client machine for remote desktop access to the target machine. Typically the remote desktop access connection session (also denoted herein a "connection session") is established by the exchange of a sequence of messages in a remote desktop access protocol (for example Microsoft's RDP).

Target machine 150 uses the established remote desktop connection session to acquire information about the system environment of client machine 100. This information is analyzed to assess a risk measure for the remote desktop access connection session, as described below. Optionally the risk measure reflects a risk level of the connection session and/or connection itself and/or indications of suspicious use (which may indicate a potential attack and/or an unauthorized user, etc.).

Optionally, the analysis includes determining the configuration of the client machine based on the acquired information. The determined configuration is optionally compared to an expected configuration of the client machine. Differences between the determined configuration and the expected configuration may be used during the assessment of the risk measure.

Optionally, the information is acquired by target machine 150 by at least one of:

a) Accessing a client machine resource using the remote desktop access connection;

b) Querying client machine 100 over the remote desktop access connection (for example using standard messages of the protocol used for the remote desktop access connection);

c) Extracting information from in messages sent by client machine 100 over the remote desktop access connection (for example the request to establish the remote desktop connection); and d) Issuing a command over the remote desktop access connection (e.g. to the operating system or other client machine local resource) to obtain information about the client machine system environment.

As used herein the term "client machine resource" means a resource of the client machine which is accessible by the target machine using the remote desktop access connection. Client machine resources may be local to the client machine (e.g. internal memory, operating system, applications, etc.) or external resources which are accessed by the target machine via the client machine (e.g. external memory, network connections, peripheral equipment, etc.). Optionally, a client machine resource is a shared resource as described below. For example, the client machine resource may be a local drive on the client machine, or remote from the client but associated with the client machine and with shared access to target machine 150 over the remote desktop access connection (e.g. allowing target machine 150 to access files stored on the shared resource as if they were on a shared location over the network).

Optionally, target machine 150 additionally gathers information for analysis from general network traffic communicated from the client system before or during an active remote desktop access session between the target machine and the client machine. For example, target machine 150 may identify and parse characteristics and/or metadata of the remote desktop access session being conducted with by packet capture and deep packet inspection (DPI) techniques known and yet to be known in the art.

Optionally, the information obtained by target machine 150 and used for the analysis includes one or more of:
a) client machine properties and/or settings;
b) type and/or settings of the client machine's operating system;
c) types and/or properties of applications installed and/or running on the client machine;
d) data stored on the client machine;
e) external data accessible via the client machine;
f) client machine network connection(s); and
g) type and/or configuration of client machine's peripheral equipment.

Optionally, some or all of the obtained information is stored. The stored information may, for example, be useful for monitoring the behavior of a suspicious client machine over time, deciding a control action to perform, offline analysis, etc.

Optionally, target machine 150 invokes a data transfer from client machine 100. This data transfer may be one or both of:
a) Data transfer from the client machine to the target machine; and
b) Data transfer from the client machine to a remote machine, server or network element.

FIG. 1 illustrates an exemplary embodiment in which the remote server is authentication server 190. In this exemplary configuration, in response to the invocation client machine 100 may provide authentication server 190 with the information required to authenticate client machine 100 (and/or client application running on client machine 100). Authentication server 190 can authenticate client machine 130 to target machine 150 and/or provide some or all of the information directly to target machine 150.

Optionally, target machine 150 includes at least one hardware processor 160 which runs code stored on non-transitory storage medium 170, thereby causing the processor to implement embodiments of the invention as described herein.

Optionally, target machine 150 is a designation machine which client machine 100 is attempting to access remotely over the remote desktop accession connection. The designation machine performs the analysis and assesses the risk measure by itself, without an intermediate machine (e.g. proxy) performing these functions in between client machine 100 and the designation machine. Further optionally, the designation machine applies control actions governing the actions performed upon it by client machine 100, based on the assessed risk measure.

Optionally, the identity of the designation machine is specified in the request for remote desktop access or is derivable by analysis of the request.

The target machine and/or client machine may have any architecture and/or functionality and/or computing environment known in the art which allows for the establishment of a remote desktop access connection with a client machine. Examples of such computing environments include but are not limited to:

a) A serverless computing environment, where a client machine and/or target machine may include code that is executed in a cloud-based deployment infrastructure without a dedicated virtualization platform being associated with the target machine or client machine;
b) A cloud computing environment;
c) An on-premise computing environment;

Optionally, target machine 150 is one of:
a) a hardware machine (e.g. endpoint machine);
b) a server;
c) a distributed server;
d) a proxy (see FIG. 2); and
e) a cloud based asset.

Some embodiments the invention are implemented as a validation service deployed on the target machine. The validation service gathers information regarding the client system environment over the remote desktop access connection analyzes the information and generates the risk assessment and/or indication of suspicious use. Optionally the validation service selects a control action to be applied, in accordance with the risk assessment and/or indication of suspicious use.

Figure 2:
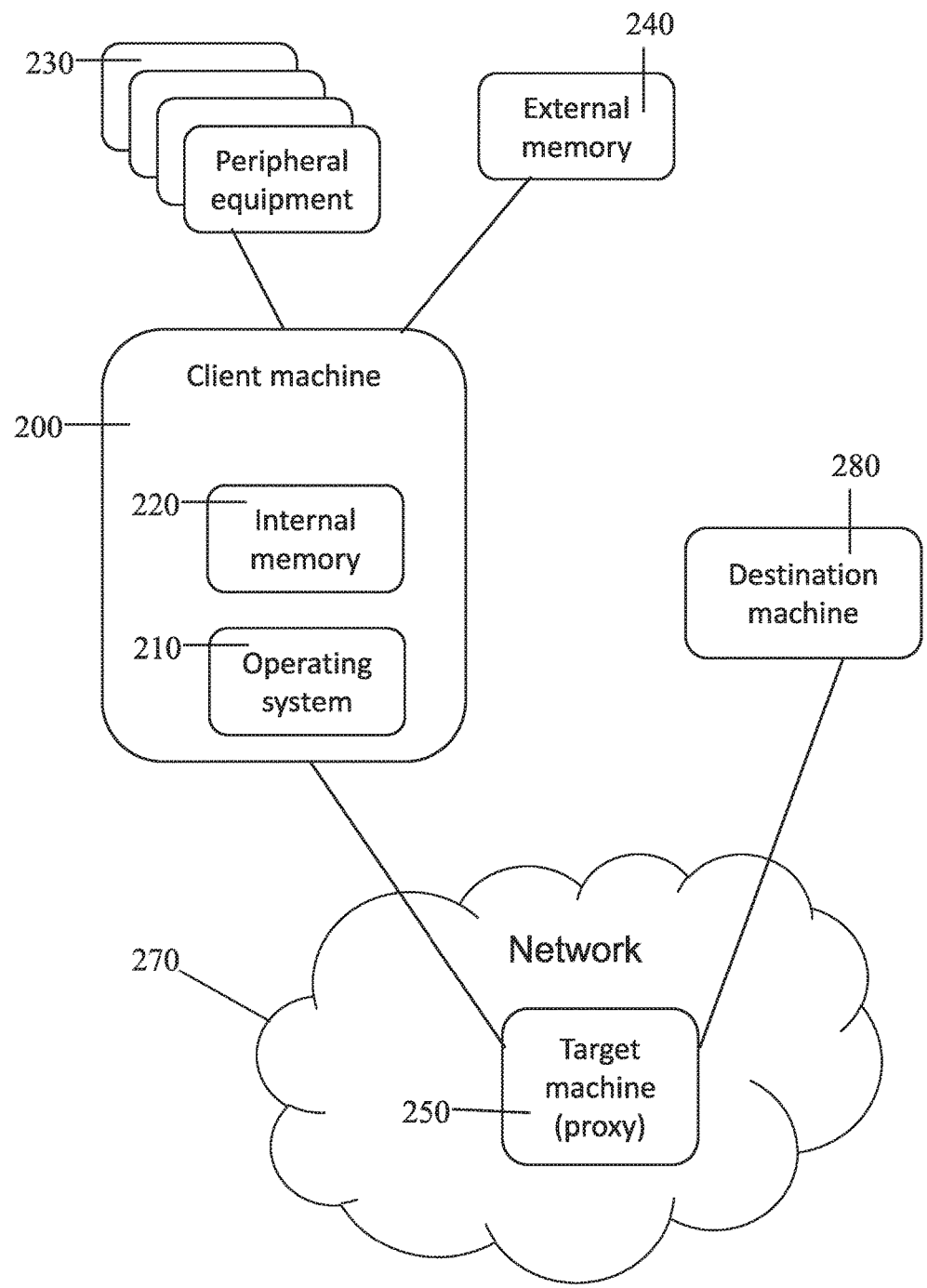
FIG. 2 is a simplified network diagram illustrating a target machine acting as a proxy between the client machine and the destination machine, according to embodiments of the invention.

Reference is now made to FIG. 2, which is a simplified network diagram illustrating a target machine acting as a proxy between the client machine and the destination machine, according to embodiments of the invention. In this embodiment, target machine 250 is an intermediate element (e.g. proxy) on the remote desktop access connection between client machine 200 and destination machine 280. The intermediate element may be of any type known in the art, including an intermediate hardware machine, server, distributed server, etc.

Destination machine 280 contains the resources which client machine 200 is attempting to access remotely over the remote desktop access connection. Optionally, client machine 200 is aware of the proxy connection. Alternately, client machine 200 is not aware of the proxy connection.

The request for remote desktop connection received from client machine 200 may or may not specify the destination machine, depending upon the operation of the protocol and client/target/destination machines. For example, the connection request may specify the target machine. Then the target machine selects a destination machine according to system requirements and acts as a proxy on the remote desktop access connection between client machine 200 and destination machine 280.

Figure 3:
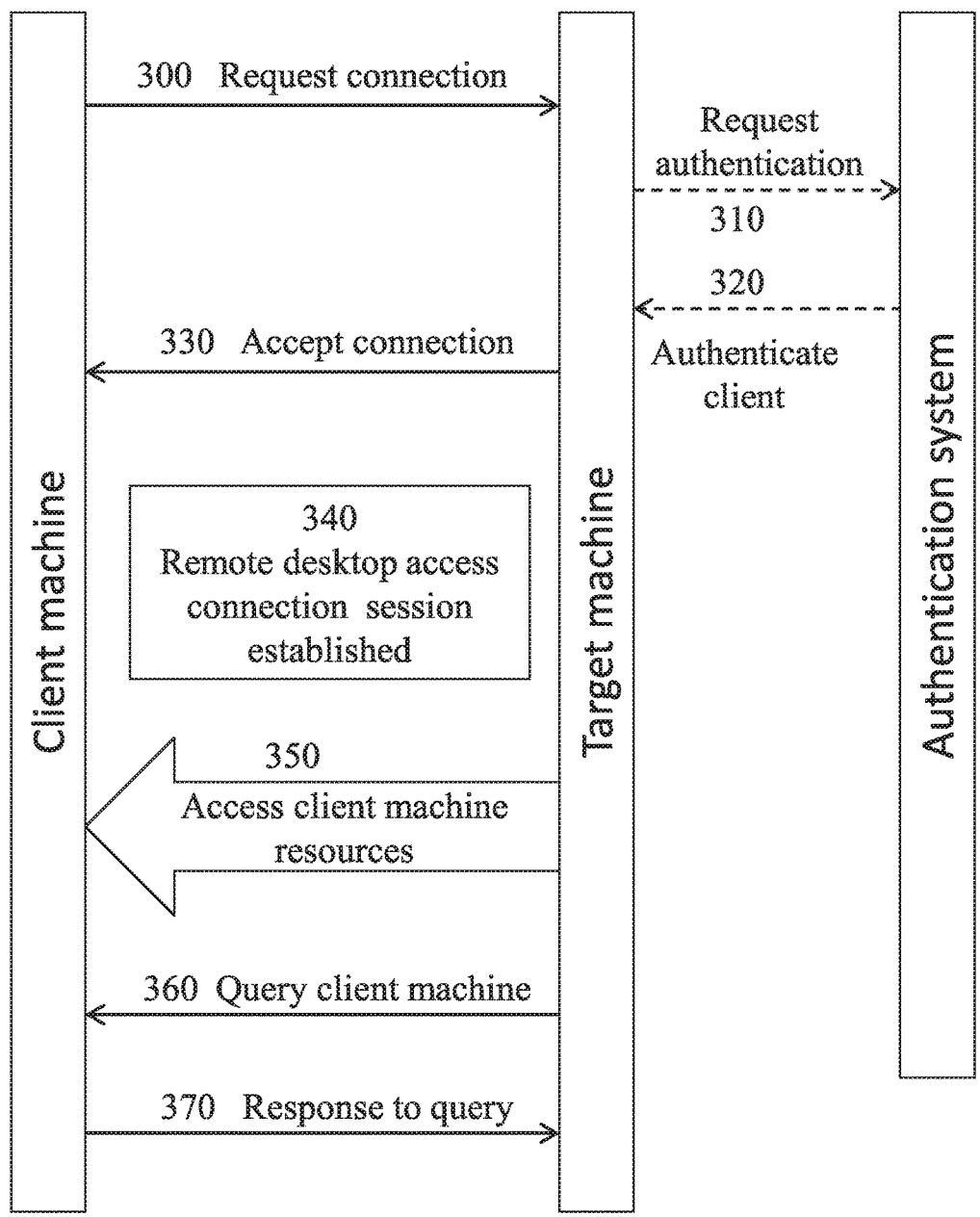
FIG. 3 is a simplified messaging diagram illustrating communication between the client machine and target machine, in accordance with embodiments of the invention.

Reference is now made to FIG. 3, which is a simplified messaging diagram illustrating communication between the client machine and target machine, in accordance with embodiments of the invention.

Messages 300-340 establish the remote desktop access connection:

| | |
|---|---|
| 300 | The client machine requests a remote desktop access connection with the target machine |
| 310-320 | Optionally, the target machine authenticates/validates the client machine (or client machine application) with an authentication system |
| 330 | The target machine accepts the connection request |
| 340 | The remote desktop access connection session is established between the client machine and the target machine |

Messages 350-370 acquire information about the client machine for use by the target machine during analysis:

| | |
|---|---|
| 350 | The target machine acquires information by accessing client machine resources |
| 360-370 | The target machine acquires information by querying the target machine and receiving a response to the query from the client machine |

For clarity, FIG. 3 shows a single access to client machine resources and a single query/response. However this example is not intended to be limiting. Accesses to client machine resources and queries to the target machine may be performed independently and in any order, singly or repeatedly and/or at any time during the remote desktop connection session.

A benefit of embodiments of the invention is that these techniques for obtaining information for analysis by the target machine are undetectable by the client machine. From the viewpoint of the client machine, the target machine is simply making use of resources that the client has chosen to share and/or exchanging messages in accordance with an accepted remote access protocol.

Analysis

The information obtained about the connecting client machine is analyzed by comparing the acquired information to a defined use of the client machine. Optionally, the analysis includes determining the configuration of the client machine based on the acquired information.

Optionally, the defined use is indicated by one or more of:
a) A policy specified per user and/or per group of users and/or specified machines; and
b) Information collected of historic use of the client machine (for example, what applications a given user ran during previous connection sessions, data accessed by the client machine during previous connection sessions, etc.).

The analysis may be performed by any means known in the art, including but not limited to one or a combination of:
a) Statistical analysis;
b) Rule-based analysis;
c) Comparison to a specified policy.

Based on the analysis, an assessment is made of a risk measure for the connection session. Optionally, the risk measure is based on one or both of:
a) A risk level of the remote desktop access connection session. The risk level is not necessarily a single value or rating, but rather may include a comprehensive evaluation identifying different risk elements (such as the identity of the user, a trust level associated with the user, client machine location, unusual client machine configuration, strength of the provided credentials etc.);
b) An identification of suspicious use of the remote desktop access connection session by the client machine.

Optionally, suspicious use includes use of the remote desktop access connection by an unverified application and/or unauthenticated user and/or performing an unauthorized operation on said target machine (such as attempts to access sensitive information, to send files outside the organization, etc.).

The analysis and/or assessment of the risk measure may be performed at any phase during the remote desktop access connection, according to the specific implementation, including but not limited to:
 a) On demand (e.g. upon receiving an command to generate an assessment and/or upon identifying client machine access to sensitive data);
 b) While establishing the connection session (e.g. the client machine may not be allowed access to the target machine over the remote desktop connection until a risk assessment has been performed);
 c) During an established remote desktop connection session (e.g. for controlling client machine access and operations on the target machine over the remote desktop connection);
 d) Prior and/or during an authentication process held between the target machine and the connecting client machine;

Optionally the analysis is performed dynamically during the remote desktop session, in order to reevaluate the risk level and/or to identify suspicious operations by the client machine during the course of the remote desktop access.

In an exemplary embodiment, the information obtained about the client system is analyzed as follows in order to identify suspicious connections which are considered to have a high risk level.

1) Printers—The printers defined on the client machine are compared to an organization's printer list. A client machine is considered suspicious if it is connected to a printer that does not appear on the printer list;

2) Keyboard layout—By comparing the keyboard layout of the client machine to the expected keyboard layouts of users within the organization. A client machine is considered suspicious if it has an unusual or unexpected layout (e.g. when the client machine keyboard layout is for a different language than the language used by users in the organization).

3) Number of screens used by the client machine—The number of screens may be mapped to each user. If a connecting user has an unexpected number of screens the client machine is considered suspicious.

Client Machine Resources

Optionally some or all of the information used by the target machine to perform the analysis is acquired by accessing a client machine resource over the remote desktop access connection.

Optionally, a client machine resource is:
 a) a local memory (e.g. local drive) of the client machine;
 b) a file or other data stored on the local memory;
 c) an external memory used by the client machine;
 d) a file or other data stored on the external memory;
 e) an application residing on the client machine;
 f) peripheral equipment connected to the client machine;
 g) an operating system of the client machine; and
 h) a network connection of the client machine.

For example, when the client machine resource is a local drive on the client machine, the target machine is able to access files stored on the local drive as if they were on a shared location over the network. This enables the target machine to retrieve emails, recent documents, passwords, etc. that are stored on the local drive. Similarly, the target machine may access the contents of a shared clipboard (to see cut and paste data of special interest to the attacker such as an email address). Analysis of this type of information might help an attacked target machine find out the attacker's identity and motive.

Other information which may be obtained when the target machine accesses client machine resources includes but is not limited to:
a) File structures, registries, E-Mails, passwords etc.;
b) Memory components, such as mapping of specific files and documents and residing applications, mapping of processes and services running/operating/deployed on the client system, etc.;
c) Storage units;
d) Redirection of resources;
e) Computing and processing resources; and
f) Other connected drives, devices and peripherals (e.g. printers, clipboard, etc.).

Typically the remote desktop access protocol allows the client machine to specify types of resources that are to be shared with the target machine. A user (e.g. an attacker) may choose to share these resources to enable easy and intuitive work on the target machine. Alternately or additionally, the remote desktop access protocol may automatically share client machine resources with the target machine.

For example, with Microsoft's Remote Desktop Protocol (RDP) the user may choose to share three different types of resources with the target machine:
A. Local drives—When a local drive is shared, the user is able to use the file explorer program on the target machine to access the local drive of the client machine (e.g. the client machine's C drive may be accessed by the address \\tsclient\c$\). This special mapping is done automatically by the RDP connection when the user chooses to "map local drives". For example, a user who wants to run a client machine script (for example C:\scripts\MyScript.txt) on the target machine may choose to share the client machine's drive. Then the target machine can access the desired script directly over the remote desktop access connection (using \\tsclient\c$\scripts\MyScript.txt).
B. Printers—By choosing to map the printers, the client machine's printers are accessible from the target machine.
C. Clipboard—When a user copies\cuts some text on a Windows environment, this text is copied to the clipboard so that the user can paste it later at another location. By choosing to share the clipboard on a RDP connection, the client clipboard is accessible from the target machine, enabling easy copying of text from the client machine to the target machine and vice versa.

Extracting Protocol Message Information

When a remote desktop access connection is established, information about the client machine may become available to the target machine based on messaging that takes place between the client machine and the target machine over the remote desktop access connection using the remote desktop access protocol.

Optionally some or all of the information used by the target machine to perform the analysis is extracted from messages communicated between the client machine and target machine. Further optionally, this information is extracted by reading fields of interest in messages sent to the target machine by the client machine.

Examples of information which may be extracted from messages include but are not limited to: keyboard layout and content, configuration settings and display settings (e.g. screen resolution and number of screens).

The message containing the extracted information may originate independently from the client machine and/or be provided by the client machine in response to a query from the target machine.

Optionally, the information is automatically included in the message in accordance with the remote desktop access protocol. For example, an Microsoft RDP request for connection automatically includes the keyboard layout of the client (e.g. Canadian French/English/etc.) and the number of screens used on the client machine, and Microsoft RDP's "GetClientData" query message causes the client machine to return the WTS_Client_Data structure, which includes information such as keyboard layout, time zone, client name and client product ID.

Control Actions

Optionally, based on the results of the analysis, a control action is applied in order to govern remote desktop access by the client machine to the target machine.

Optionally, the applied control action is based, at least in part, on the risk measure. Thus a more stringent control action may be applied to a client machine operation during highly risky connection session whereas a less stringent control action is applied to the same operation over a low-risk connection session.

Alternately or additionally, the analysis identifies suspicious use of the remote desktop connection session and the applied control action is selected, at least in part, in accordance with the specific type and/or severity of the suspicious use. For example, the client machine may be permitted to read sensitive files, blocked from sending sensitive files out of the organization and be disconnected from remote desktop access when attempting unauthorized use of a target system application.

Optionally, the control action is selected based on a set of logical rules and/or a policy and/or specified parameters, in order to enforce system requirements and specific implementations. An exemplary embodiment of selecting a control action is described below for FIG. 8.

Optionally, the control action controls one or more of the following:
a) Access and operations by the client machine to resources and applications on the target machine. For example, for a slightly suspicious client, the control action may be to block access to sensitive data;
b) The connection established between the client machine and the target machine. For example, for a very suspicious client, the control action may be to terminate the session and disconnect the client.
c) Specific sessions between the client and different applications on the target. For example, the control action may be to continue an existing session or to allow a client machine request for a new session (e.g. for a suspicious client, block access to the PowerShell program).
d) Specific operations and/or request for operations from the client machine over the remote desktop access connection. For example, for a suspicious client, the control action may be to block specific operations, such as running the Registry editor.
e) Alarm and/or isolate the client machine from the system network and/or system environment; and
f) Change credentials to services which may be exposed and/or accessible, in view of the potential attack associated with the suspicious use of the remote connection. Credentials change and other modification activities may be performed automatically, semi-automatically or manually, and may be performed only with respect to services that are deemed sensitive, by utilizing known and yet to be known technology.

A control action may comprise or set (e.g. invoke or induce) responsive actions and/or other control measures, some of which may include:

a) Initiating copy of suspicious files, or files associated with a very suspicious client (e.g. suspected to be an attacker). This is referred to as counter intelligence and may be used in various manners in order to analyze the attacker's intentions and directions.

b) Changing or complete deletion of files and information.

c) Sandboxing the client machine. The remote desktop access connection client is transferred to a different machine without the knowledge of the client machine. The client machine is unable to harm the client machine and/or organization over the remote desktop access connection with the different machine. The sandboxed client machine may be monitored and information may be collected, for example to determine the attacker's identity and/or to combat malicious activities.

In an exemplary embodiment, a responsive action is induced in response to, or based on, the identification that the remote desktop access connection is under potential suspicious use and/or in response to and/or based on the a high risk measure assessment for the connection session. The responsive action may comprise notifying a user or a system associated of the suspicious use or of the assessed risk level, respectively. For example, by outputting a notification to an Information Technology (IT) department of an organization associated with the client machine.

The control action may include actions such as applying protection or security measures on applications executed by the client machine. Such security measures may be configured to protect one or more additional applications from potential attacks that are similar to the potentials attack associated with the suspicious use of the connection.

In some exemplary implementations, the control action comprises opening a Virtual Private Network (VPN) connection. The VPN connection may block potential attacks before reaching the one or more additional applications, whether on the client machine and/or accessible by the target machine.

Figure 4:
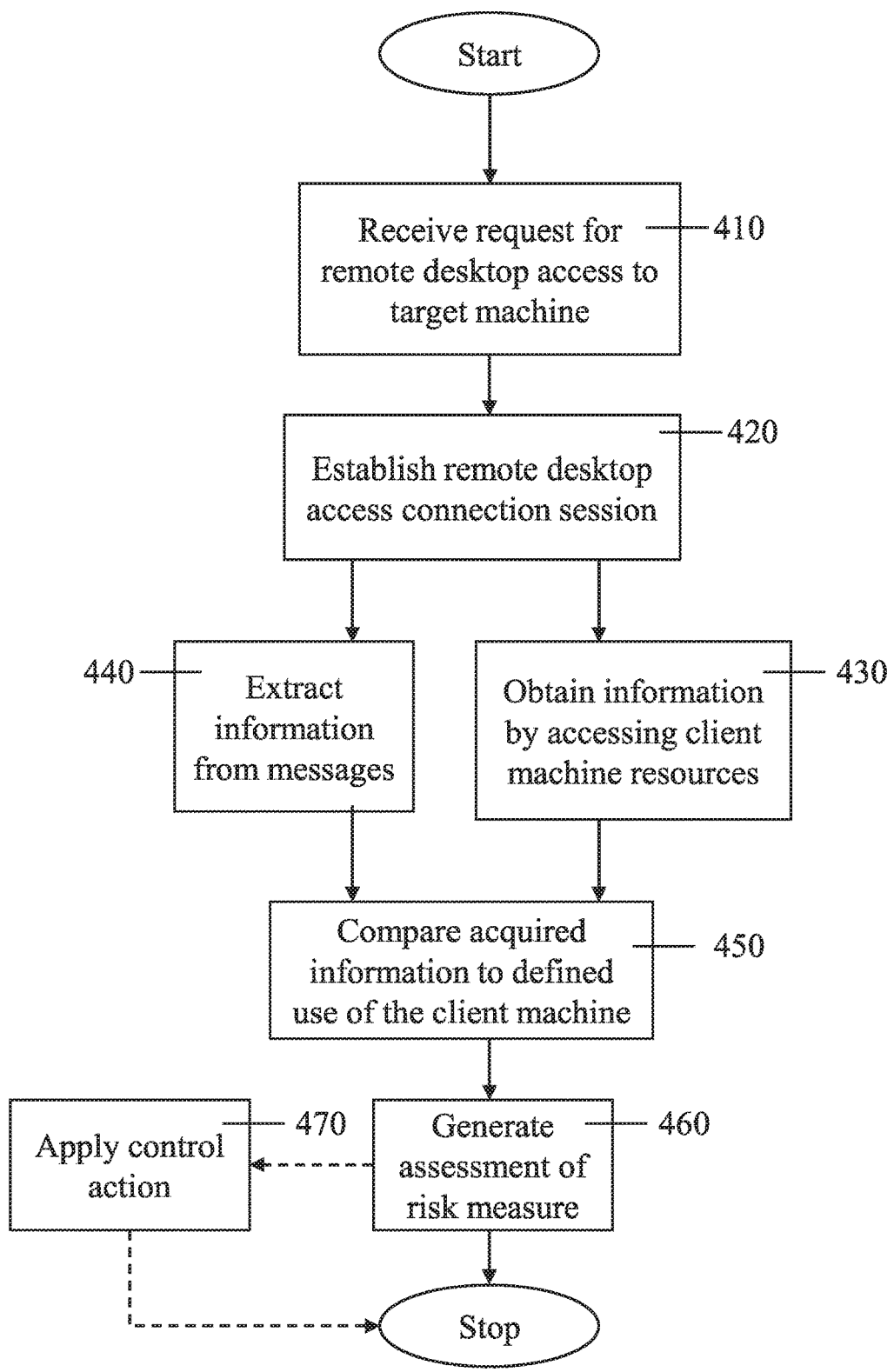
FIG. 4 is a simplified flowchart of a method for assessing a risk measure of a remote desktop access connection session, according to embodiments of the invention.

Method for Assessing a Risk Measure of a Remote Desktop Access Connection Session Reference is now made to FIG. 4, which is a simplified flowchart of a method for assessing a risk measure for a remote desktop access connection session, according to embodiments of the invention. Optionally the method is performed by at least one hardware processor executing program instructions.

Optionally the method is performed by the client machine. Alternately or additionally, the method or portions thereof are performed by a different computing machine or machines (such as a third-party server or service, cloud-based server, etc.).

In 410 a request to establish remote desktop access is received from the client machine.

In response to the request, in 420 a remote desktop access connection session is established between the target machine and the client machine.

In 430 and 440 information about the system environment of the client machine during the connection session is obtained by the target machine using the remote desktop access connection. Specifically, in 430 information is acquired by the target machine by accessing client machine resources as described above. In 440 information about the client machine is extracted by target machine from messages received over the remote desktop access connection as described above.

For clarity, FIG. 4 shows a non-limiting embodiment in which 430 and 440 are performed a single time in parallel. In other embodiments only one of 430 or 440 is performed (i.e. information is acquired about the client machine either by accessing client machine resources or by extraction from messages but not both). FIG. 4 is also non-limiting as to the relative timing, frequency and number of times 430 and 440 are performed. For example, 430 and 440 may be performed in sequence not in parallel. In another example, 430 is performed a single time (e.g. client machine resources are accessed once when the connection is established) whereas 440 is performed multiple times (e.g. information is extracted from messages continuously during the entire remote desktop session).

Optionally, the acquired information includes at least one of:

a) the operating system of the client machine;
b) at least one setting of the client machine's operating system;
c) an operating parameter of the client machine;
d) the configuration of the client machine;
e) peripheral equipment connected to the client machine;
f) a network connection of the client machine;
g) data stored on the client machine;
h) user preferences set on the client machine;
i) a user-specific setting of the client machine;
j) a storage unit of the client machine;
k) a processor of the client machine;
l) an application installed on the client machine;
m) an application running on the client machine;
n) a process executing on the client machine;
o) an application instance running on the client machine;
p) a local resource on the client machine; and
q) an external resource accessible by the client machine.
r) a connection setting pertaining to the client machine for the connection session;
s) the screen resolution of the client machine,
t) the language setting of the client machine; and
u) visual display characteristics of the client machine.

In 450 the acquired information is analyzed by comparing the acquired information to a defined use of the client machine. Optionally, the defined use is defined by one or more of:

a) a policy specified per user and/or per group of users and/or machines in an organization; and
b) information collected of historic use of the client machine.

Optionally the analysis identifies one or both of:

a) Potential risks based on the configuration of the client machine; and
b) Suspicious use of the target machine by the client machine during the connection session.

In 460 an assessment of the risk measure of the connection session is generated, based on the analysis in 450. Exemplary embodiments of assessing a risk measure are described below for FIGS. 5, 7 and 8.

Optionally, the risk measure is indicative of one or more of:

a) the risk level of the remote desktop access connection;
b) the risk level of particular session(s) established the remote desktop access connection;
c) the risk level of the connecting client machine; and
d) suspicious use of the client machine.

Optionally, the risk measure is numerical.

Optionally, in 470 a control action is applied in accordance with the assessment.

In an exemplary embodiment, respective numerical risk levels are specified for different types of potential risks. For example an organization may assign numerical values to anomalous client system environment, user behaviors, credential strength and so forth. Examples of potential risks which an organization may wish to assign a respective risk level include but are not limited to:

a) Client machine properties which are atypical in the organization (such as IP address, keyboard layout, peripheral equipment, etc.);

b) Behavioral properties per user. If the user's credentials are stolen the attacker will typically behave differently than the legitimate user (e.g. access different files, open different applications, etc.).

c) Number of open sessions for a given client machine (more than one active remote desktop access session from a single client machine may indicate that an attacker has taken over than client machine and opened a new session);

d) The time of remote desktop access (unusual timing of the remote desktop access connection may indicate that the attacker is in an unexpected time zone).

The risk measure of a given connection session may be calculated from the respective levels of multiple risk factors. For example, remote desktop access from a different time zone alone may be considered a low risk (e.g. the user may be traveling); however in combination with an unexpected keyboard layout the risk level may be assessed as being higher.

Figure 5:
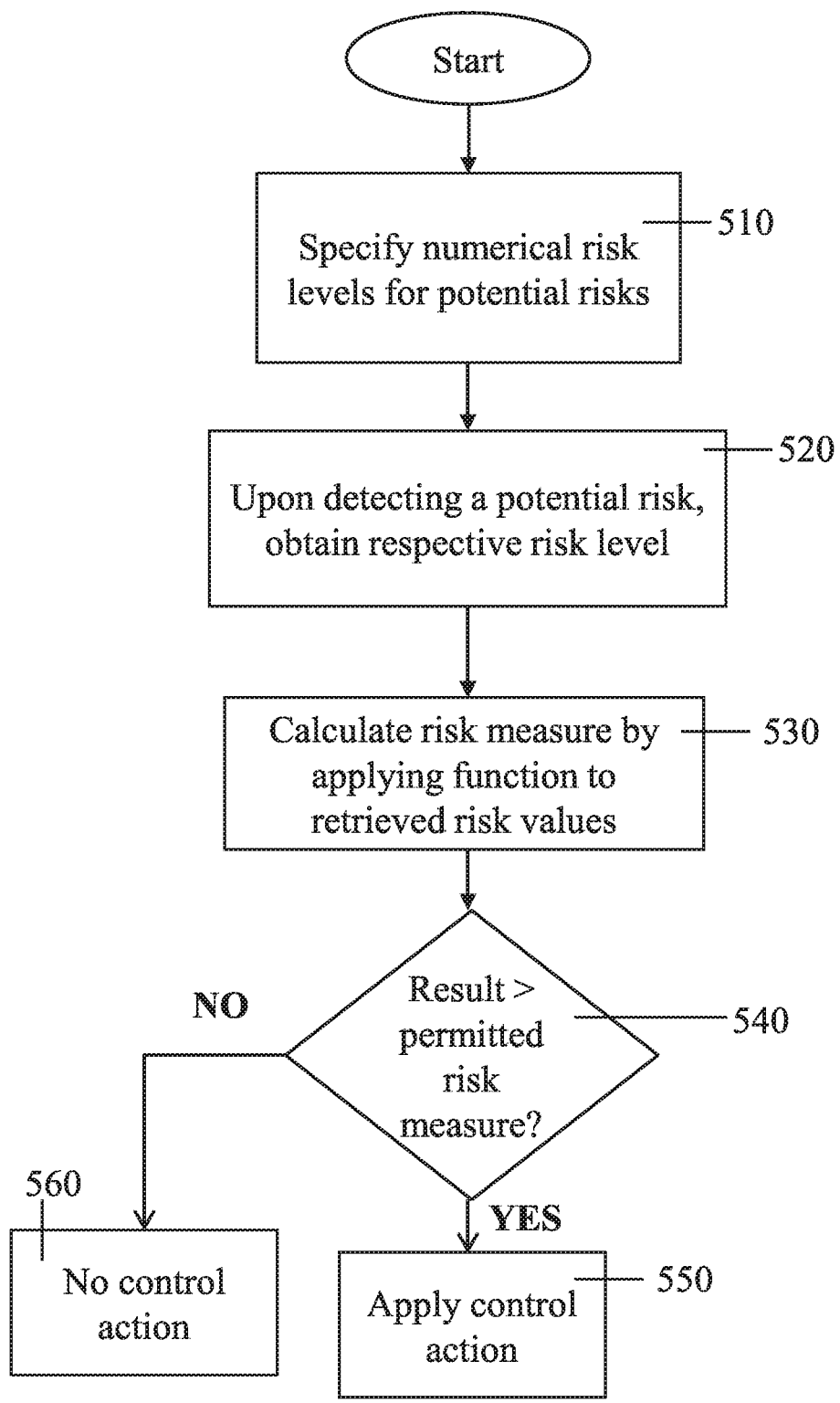
FIG. 5 is a simplified flowchart of a method of calculating a risk measure according to an exemplary embodiment of the invention.

Reference is now made to FIG. 5, which is a simplified flowchart of a method of calculating a risk measure according to an exemplary embodiment of the invention.

In 510 respective numerical risk levels are assigned to different types of potential risks. These respective risk levels may be defined, for example, in accordance with an organizational policy or by a system administrator.

In 520, when a potential risk is detected the respective risk level is obtained. These respective risk levels are gathered over time. Optionally, the respective properties are gathered during the entire remote desktop access connection session or during portions of remote desktop access connection session.

In 530, a risk measure is calculated by applying a numerical formula to the respective risk levels gathered during the remote desktop access connection. In one exemplary example, the obtained risk levels are summed together to calculate the total risk level. In another exemplary example, respective weightings are assigned to different types of potential risk, the obtained risk levels are multiplied by their weighting factor and are then summed to calculate the total risk level.

In 540, the risk measure is compared to a threshold. If the risk measure is higher than the threshold, a control action is applied in 550. Otherwise, no control action is applied in 560. Optionally, multiple thresholds are defined, for example indicating low risk, high risk and excessive risk. Different control actions may be applied for different risk measure values based on the multiple thresholds.

Figure 6:
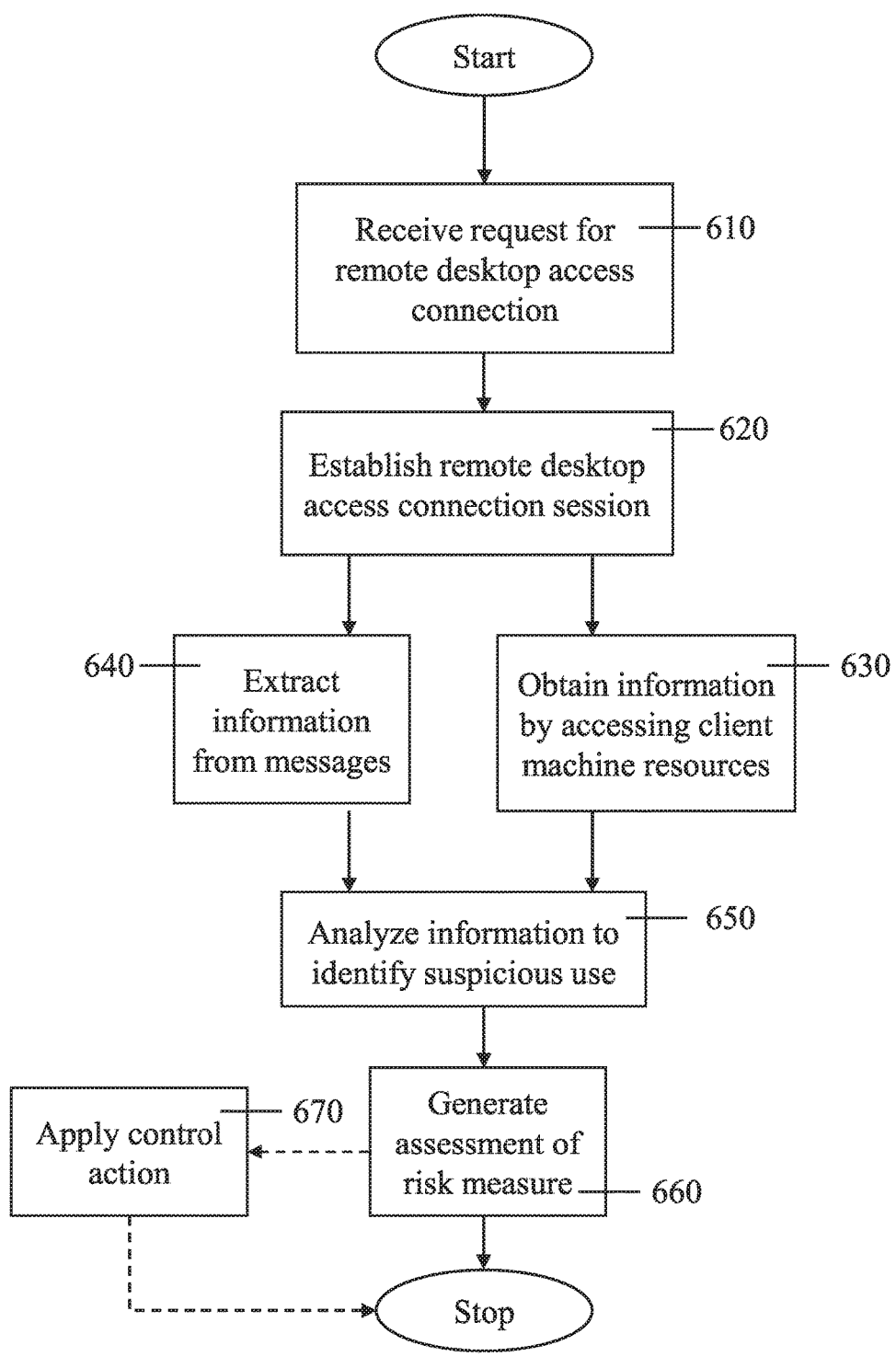
FIG. 6 is a simplified flowchart of a method for assessing a risk measure of a remote desktop access connection session according to an exemplary embodiment of the invention.

Method for Assessing a Risk Measure Based on Suspicious Use of a Remote Desktop Access Connection Reference is now made to FIG. 6, which is a simplified flowchart of a method for assessing a risk measure based on_suspicious use of a remote desktop access connection session according to an exemplary embodiment of the invention. FIG. 6 corresponds substantially to FIG. 4, with the difference that in 650 occurrences of suspicious use during the connection session are identified (whereas in 450 the risk measure is based on potentials risks associated with the connection session). Optionally the method is performed by at least one hardware processor executing program instructions.

Optionally the method is performed by the client machine. Alternately or additionally, the method or portions thereof are performed by a different computing machine or machines (such as a third-party server or service, cloud-based server, etc.).

In 610 a request is to establish remote desktop access is received from the client machine.

In response to the request, in 620 a connection session is established between the target machine and the client machine over a remote desktop access connection.

In 630 and 640 information about the system environment of the client machine during the connection session is obtained by the target machine using the remote desktop access connection. Specifically, in 630 information is acquired by the target machine by accessing client machine resources as described above. In 640 information about the client machine is extracted by target machine from messages received over the remote desktop access connection as described above.

For clarity, FIG. 6 shows a non-limiting embodiment in which 630 and 640 are performed a single time in parallel. In other embodiments only one of 630 or 640 is performed (i.e. information is acquired about the client machine either by accessing client machine resources or by extraction from messages but not both). FIG. 6 is also non-limiting as to the relative timing, frequency and number of times 630 and 640 are performed. For example, 630 and 640 may be performed in sequence not in parallel. In another example, 630 is performed a single time (e.g. client machine resources are accessed once when the connection is established) whereas 640 is performed multiple times (e.g. information is extracted from messages continuously during the entire remote desktop session).

In 650 the acquired information is analyzed and suspicious use during the connection session is identified by comparing the acquired information to a defined use of the client machine.

In 660 a risk measure is assessed based on identified suspicious use of the client machine during the connection session is identified when it occurs, based on the analysis.

Optionally, in 670 a control action is applied in accordance with the assessment.

In an exemplary embodiment, the risk measure is based on detected suspicious use of the target machine during the connection session. In this exemplary embodiment, respective suspicion levels are specified for different types of suspicious use. For example an organization may assign numerical suspicion level values to anomalous activity over the remote desktop access connection, attempts to access data or application which are not usually accessed by the user whose credentials were used to establish the remote desktop access connection, attempts to transfer data outside of the organization and so forth.

The risk measure for a connection session is calculated from respective suspicion levels for suspicious use actions. For example, unusual access to a particular application may be considered to be of low suspicion, however in combination with an attempt to transfer information out of the organization may be assessed as being higher.

Figure 7:
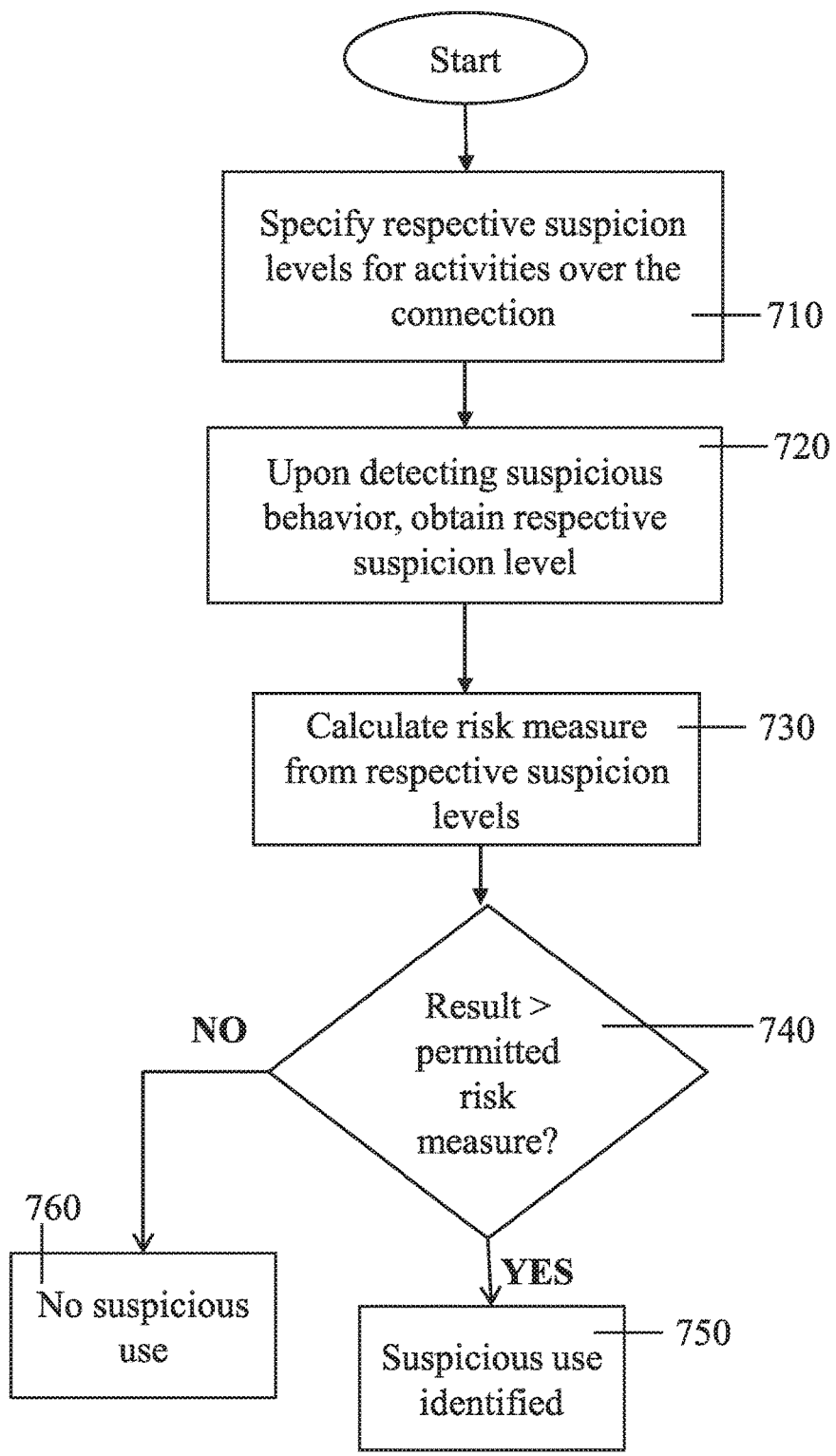
FIG. 7 is a simplified flowchart of a method of calculating a risk measure of a remote desktop access calculating an assessment of suspicious use according to an exemplary embodiment of the invention.

Reference is now made to FIG. 7, which is a simplified flowchart of a method of calculating a risk measure of a remote desktop access connection session, according to an exemplary embodiment of the invention. FIG. 7 parallels the exemplary embodiment of FIG. 5, with the difference that in 730 the risk measure is calculated from suspicion levels assigned to respective types of suspicious use of the target machine (whereas in 530 the risk measure is based on values associated with potential risks associated with the connection session).

In 710 respective numerical suspicion levels are assigned to different types of suspicious use which may occur during a connection session. These respective suspicion levels may be defined, for example, in accordance with an organizational policy or by a system administrator.

In 720, when a suspicious use is detected the respective suspicion level is obtained. These respective suspicion levels are gathered over time (for example during the entire connection session or during portions of the connection session).

In 730, the risk measure is calculated by applying a numerical formula to the respective suspicion levels gathered during the connection session or a portion thereof. In one exemplary example, the respective suspicion levels are summed together to calculate the total suspicion level. In another exemplary example, respective weightings are assigned to different types of suspicious use; the obtained suspicion levels are multiplied by their weighting factor and are then summed to calculate the total suspicion level.

In 740, the risk measure is compared to a threshold. If the risk measure is higher than the threshold, a control action is applied in 750. Otherwise, no control action is applied in 760. Optionally, multiple suspicion level thresholds are defined and different control actions may be applied for different total suspicion levels based on the multiple thresholds.

Optionally, both the suspicion levels and the risk levels are combined to select the control action.

Figure 8:
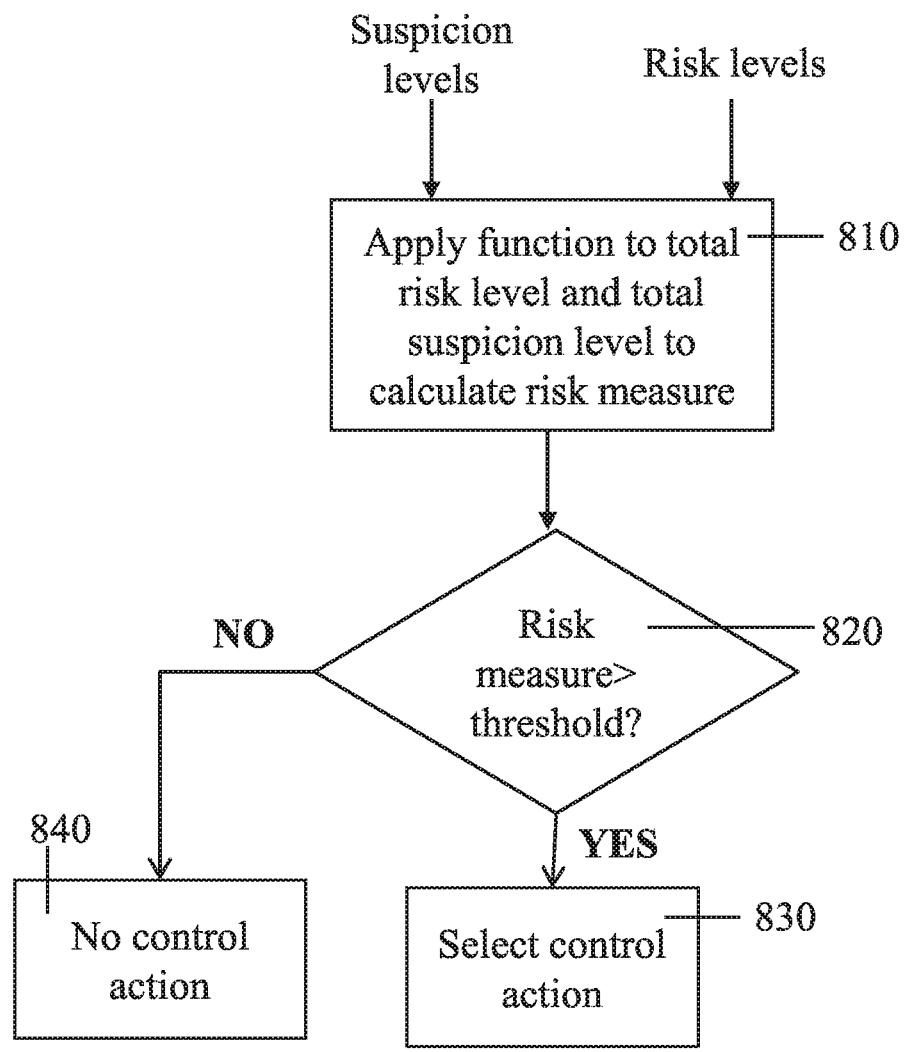
FIG. 8, which is a simplified flowchart of a method for selecting a control action according to an exemplary embodiment of the invention.

Reference is now made to FIG. 8, which is a simplified flowchart of a method for selecting a control action according to an exemplary embodiment of the invention.

In 810, the risk levels and suspicion levels are input into a formula. The value output by the function is a risk measure which is a general assessment of the level of overall security of the remote desktop access connection based both on potential risks and suspicious use. In 820, the risk measure is compared to a threshold (or thresholds). If the general assessment level exceeds one or more threshold, a control action is selected in 830 based on the general assessment level. If the general assessment level does not exceed a threshold, in 840 no control action is selected.

Types of client machine resources, control actions, machines other implementation details and combinations thereof, which may be used to create various embodiments of the invention, are described herein in a non-limiting manner.

In summary, the above described embodiments provide a target machine with the capability of dynamic, real time validation of the system environment of a client machine connecting or connected to a target machine by a remote desktop access connection. The target machine (or a service running thereon) may perform a validation process through direct interaction with the connecting client machine environment and/or by extracting information from parameters made available by the remote desktop access connection.

The validation process is applied over the remote desktop access connection channel established between the client machine and target machine and does not require establishing or using another communication channel in order to obtain the information and data used for the analysis. As an additional benefit, the target machine may acquire and analyze the information about the client machine in an autonomous manner, independently of third party operation or any service on the target machine.

The methods as described above are used in the fabrication of integrated circuit chips.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant remote desktop access connections, remote desktop access protocols, system environments, client machines, target machines, proxies and networks will be developed and the scope of the term remote desktop access connection, remote desktop access protocol, system environment, client machine, target machine, proxy and network is intended to include all such new technologies a priori.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A system, comprising:
    at least one non-transitory computer readable storage medium storing instructions; and
    at least one processor configured to execute said instructions to:
        establish, in response to a request received from a client application for remote desktop access to a target application, a connection session of a remote desktop access connection with said client application over a network, said client application being associated with one or more credentials;
        acquire from said client application, using said remote desktop access connection, information pertaining to a system environment of said client application during said connection session;
        analyze said acquired information by comparing said acquired information to information indicative of a defined use of said client application;
        detect, based on said analyzing, suspicious activity associated with at least one of said client application, a user associated with said client application, or an account associated with said client application, wherein the detecting is independent of a validity of the one or more credentials;
        generate an assessment of a risk measure of said remote desktop access connection session; and
        perform, based on the detected suspicious activity or the risk measure, at least one control action.

2. A system according to claim 1, wherein said analyzing comprises determining a configuration of said client application based on said acquired information.

3. A system according to claim 1, wherein said acquired information comprises information indicative of at least one setting of an operating system associated with said client application.

4. A system according to claim 1, wherein said acquired information comprises information indicative of a user-specific setting of said client application.

5. A system according to claim 1, wherein said acquired information comprises information indicative of a connection setting pertaining to said client application for said connection session.

6. A system according to claim 1, wherein said acquired information comprises information indicative of a screen resolution of said client application.

7. A system according to claim 1, wherein said acquired information comprises information indicative of a language setting for said client application.

8. A system according to claim 1, wherein said acquired information comprises information indicative of a parameter effecting visual display characteristics of said client application.

9. A system according to claim 1, wherein said acquired information comprises information indicative of a process executing on said client application.

10. A system according to claim 1, wherein said acquired information comprises information indicative of an application running on said client application.

11. A system according to claim 1, wherein said acquired information comprises information indicative of peripheral equipment associated with said client application.

12. A system according to claim 1, wherein the control action governs actions performed by said client application on said target application during said connection session.

13. A system according to claim 1, wherein said acquiring comprises extracting said information from messages received from said target application over said remote desktop access connection.

14. A system according to claim 1, wherein said acquiring comprises invoking a data transfer between said client application and said target application via said remote desktop access connection.

15. A system according to claim 1, wherein said acquiring comprises invoking a data transfer between said client application and a remote server in connection with said target application.

16. A system according to claim 1, wherein said processor is further configured to execute said instructions to verify, based on said generated assessment and according to said acquired information, a client application on said client application which initiated said request for said remote desktop access connection.

17. A system according to claim 1, wherein said at least one processor is further configured to forward said request for the remote desktop access connection to a target application.

18. A method for assessing a risk of a remote desktop access connection session, comprising:
    executing, by at least one hardware processor, program instructions to:
        establish, in response to a request received from a client application for remote desktop access to a target application, a connection session of a remote desktop access connection with said client application over a network, said client application being associated with one or more credentials;
        acquire from said client application, using said remote desktop access connection, information pertaining to a system environment of said client application during said connection session;

analyze said acquired information by comparing said acquired information to information indicative of a defined use of said client application;

detect, based on said analyzing, suspicious activity associated with at least one of said client application, a user associated with said client application, or an account associated with said client application, wherein the detecting is independent of a validity of the one or more credentials;

generate an assessment indicative of a risk measure of said connection session; and perform, based on the detected suspicious activity or the risk measure, at least one control action.

19. A method according to claim 18, wherein said analyzing comprises determining a configuration of said client application based on said acquired information.

20. A method according to claim 18, wherein the control action governs actions performed by said client application on said target application during said connection session.

21. A method according to claim 18, wherein said acquiring comprises extracting said information from messages received from said target application over said remote desktop access connection.

22. A method according to claim 18, wherein said acquiring comprises invoking a data transfer between said client application and said target application via said remote desktop access connection.

23. A method according to claim 18, wherein said acquiring comprises invoking a data transfer between said client application and a remote server in connection with said target application.

24. A method according to claim 18, further comprising verifying, based on said generated assessment and according to said acquired information, said client application.

25. A non-transitory computer readable medium including instructions that, when executed by at least one processor, cause the at least one processor to perform operations for assessing a risk measure of a remote desktop access connection, said operations comprising:

establishing, in response to a request received from a client application for remote desktop access to a target application, a connection session of a remote desktop access connection with said client application over a network, said client application being associated with one or more credentials;

acquiring from said client application, using said remote desktop access connection, information pertaining to a system environment of said client application during said connection session;

analyzing said acquired information by comparing said acquired information to information indicative of a defined use of said client application;

detecting, based on said analyzing, suspicious activity associated with at least one of said client application, a user associated with said client application, or an account associated with said client application, wherein the detecting is independent of a validity of the one or more credentials;

generating an assessment of a risk measure of said remote desktop access connection session; and performing, based on the detected suspicious activity or the risk measure, at least one control action.

* * * * *